(12) United States Patent
Le

(10) Patent No.: US 6,952,756 B1
(45) Date of Patent: Oct. 4, 2005

(54) METHOD AND APPARATUS FOR SPECULATIVE LOADING OF A MEMORY

(75) Inventor: Chinh H. Le, San Jose, CA (US)

(73) Assignee: LeWiz Communications, San Jose, CA (US)

( * ) Notice: Subject to any disclaimer, the term of this patent is extended or adjusted under 35 U.S.C. 154(b) by 119 days.

(21) Appl. No.: 10/140,138

(22) Filed: May 6, 2002

Related U.S. Application Data

(60) Provisional application No. 60/289,662, filed on May 8, 2001, provisional application No. 60/289,684, filed on May 8, 2001, provisional application No. 60/289,677, filed on May 8, 2001, provisional application No. 60/289,656, filed on May 8, 2001, provisional application No. 60/289,661, filed on May 8, 2001, provisional application No. 60/289,664, filed on May 8, 2001, provisional application No. 60/289,645, filed on May 8, 2001.

(51) Int. Cl.$^7$ .............................................. G06F 12/00
(52) U.S. Cl. ...................... 711/154; 711/101; 711/105; 711/109; 711/111; 711/132; 711/154; 711/170; 365/189.12; 365/149; 365/219; 365/227; 365/236
(58) Field of Search .......................... 711/2, 100, 217, 711/218, 154, 110, 101–105, 109, 111, 132, 711/170; 710/52, 57; 365/149, 219, 189.12, 365/227, 236

(56) References Cited

U.S. PATENT DOCUMENTS

| | | | | |
|---|---|---|---|---|
| 3,962,683 A | * | 6/1976 | Brown et al. ................ | 713/600 |
| 4,267,581 A | * | 5/1981 | Kobayashi et al. .......... | 711/218 |
| 4,942,516 A | * | 7/1990 | Hyatt ........................... | 712/32 |
| 4,949,301 A | * | 8/1990 | Joshi et al. .................. | 711/100 |
| 5,121,480 A | * | 6/1992 | Bonke et al. ................... | 711/2 |
| 5,903,717 A | * | 5/1999 | Wardrop ....................... | 714/12 |
| 5,933,385 A | * | 8/1999 | Jiang et al. ............ | 365/230.01 |
| 5,959,687 A | * | 9/1999 | Dinwiddie et al. .......... | 348/564 |
| 6,381,659 B2 | * | 4/2002 | Proch et al. ................... | 710/57 |

\* cited by examiner

*Primary Examiner*—Donald Sparks
*Assistant Examiner*—Hashem Farrokh
(74) *Attorney, Agent, or Firm*—Townsend and Townsend and Crew LLP

(57) ABSTRACT

The present invention provides a speculatively loaded memory for use in a data processing system. The present invention may include a memory block including rows each identified by an address. A first register may store a first address of the memory block and a second register may store a second address of the memory block. A control circuit may be coupled to the first and second registers, and may receive control signals. The control circuit causes contents of the first register to be stored into the second register in response to a first state of the control signals, and the control circuit causes contents of the second register to be stored into the first register in response to a second state of the control signals.

9 Claims, 12 Drawing Sheets

| OSI | TCP/IP |
|---|---|
| Application (Layer 7) | Application (HTTP,FTP,SMTP, etc.) |
| Presentation (Layer 6) | |
| Session (Layer 5) | |
| Transport (Layer 4) | Transport (TCP/UDP) |
| Network (Layer 3) | Internet (IP) |
| Data link (Layer 2) | MAC |
| Physical (Layer 1) | PHY |

*FIGURE 3*

METHOD AND APPARATUS FOR SPECULATIVE LOADING OF A MEMORY

CROSS-REFERENCES TO RELATED APPLICATIONS

This application claims priority to U.S. provisional application Nos. 60/289,662, 60/289,684, 60/289,677, 60/289,656, 60/289,661, 60/289,664, and 60/289,645, all filed May 8, 2001, which are all incorporated by reference along with any references cited in this application.

BACKGROUND OF THE INVENTION

The present invention relates generally to data processing systems, and more particularly, to a method and apparatus for speculatively loading a memory in a data processing system.

Data processing systems find a wide variety of applications in electronic systems. Data processing systems may include, but are not limited to, computers, workstations, network components, printers, modems, storage devices, or any other electronic system used to manipulate data. Data processing systems may also include microprocessors, microcontrollers, digital signal processors, memory controllers, logic circuits, or other subsystem components used as the building blocks for data processing systems.

One important class of data processing systems are data communication networks. Data communication networks are used to interconnect many data processing systems, including computers, workstations, servers, printers, modems, and storage devices. For example, two or more computers may be connected together through a network such as a local area network, wide area network, or the Internet. Network users are able to share files, printers and other resources, send messages and run applications on remote computers. An important part of any data communication network includes the physical components or network communication devices used to interconnect the data processing systems. The design, architecture, and data processing techniques of the individual network components (e.g., routers, switches, and/or servers) may limit the speed and functionality of the data communication network. Moreover, network components are typically comprised of integrated circuit components that are configured together to carry out the operations and implement the functionality of the particular type of network component. For example, a network component such as a server may include integrated circuit components such as a microprocessor, microcontroller, application specific integrated circuit, memory, logic chips, and other types of chips. Accordingly, the design, architecture, and data processing techniques of the integrated circuit components utilized by the network components may also limit the speed and functionality of the computer network.

The proliferation of computers and computer networks has created an ever increasing demand for more efficient data processing systems and methods. For example, the speed of networking interconnect technologies is moving toward giga/tera bit per second range with the introduction and adoption of optical communication technologies. This will lead to a large growth in the amount of information flowing through the Internet pipeline. Accordingly, there will be a correspondingly large growth in the demand on network components and integrated circuit components to process and deliver the increasing volumes of information to the users. One term commonly used to describe the rate at which network components process information is bandwidth. Bandwidth can be affected by a variety of factors such as the efficiency of the system architecture and data processing techniques. As more data is placed on the network, the bandwidth of the network components and integrated circuit components will become a limiting factor in the speed of the overall network.

Therefore, there is a need to improve the efficiency of circuits and methods utilized in data processing systems. Furthermore, there is a need to increase the efficiency of the data processing in network components and integrated circuit components to more efficiently use available bandwidth and improve the functionality of data networks.

SUMMARY OF THE INVENTION

The present invention provides a speculatively loaded memory for use in a data processing system. The speculatively loaded memory may be loaded with data, and the data may be seamlessly retained or discarded such that the efficiency of the data processing system is enhanced. In one embodiment, the present invention includes an integrated circuit comprising a memory block. The memory block comprises rows and columns of memory cells, wherein each row in the memory block is identified by an address. The integrated circuit also includes a first register to store a first address of the memory block and a second register to store a second address of the memory block. A control circuit may be coupled to the first and second registers, the control circuit receiving first and second control signals, wherein in response to a first state of the first and second control signals, the control circuit causes contents of the first register to be stored into the second register, and in response to a second state of the first and second control signals, the control circuit causes contents of the second register to be stored into the first register.

In another embodiment, the speculatively loaded memory may be a first-in first-out memory ("FIFO"). The FIFO may include a memory block comprising rows and columns of memory cells, wherein each row in the memory block is identified by an address. The FIFO may also include a write register to store a first address of the memory block indicating a start address for data to be written into the memory block for a subsequent write operation, and an undo register to store a second address of the memory block, the second address indicating the start address for an immediately preceding write operation. Additionally, the FIFO may include a control circuit coupled to the write register and undo register. The control circuit may include first and second control signals, wherein in response to a first state of the first and second control signals, the control circuit causes contents of the write register to be stored into the undo register, and in response to a second state of the first and second control signals, the control circuit causes contents of the undo register to be stored into the write register.

In another embodiment, the present invention provides a data processing technique utilizing a speculative memory. Accordingly, an integrated circuit may comprise a memory block comprising rows and columns of memory cells, wherein each row in the memory block is identified by an address. The circuit may include a data input line coupled to a memory block input for receiving first data. A first register stores a first address of the memory block and a second register stores a second address of the memory block. The circuit also includes a data processing circuit having a first data processing input for receiving second data associated with the first data. The data processing circuit generates a result signal in response to a processing operation on the second data. A control circuit may be coupled to the first and second registers, and coupled to the data processing circuit to receive the result signal, wherein in response to a first state of the result signal, the control circuit causes contents of the first register to be stored into the second register, and in response to a second state of the result signal, the control circuit causes contents of the second register to be stored into the first register.

In one embodiment, the data processing circuit may be a dictionary lookup unit, and the first and second data may be associated string data. Additionally, the result signal may be a match signal. Thus, the dictionary lookup unit may receive the second string data and, if the second string data matches a data string in the dictionary lookup unit, a match signal is returned.

Other objects, features, and advantages of the present invention will become apparent upon consideration of the following detailed description and the accompanying drawings.

BRIEF DESCRIPTION OF THE DRAWINGS

FIG. 3 illustrates a comparison of the standard open system interconnect networking model and the TCP/IP networking model.

DETAILED DESCRIPTION

The present invention provides a method and apparatus for speculatively loading a memory to increase the efficiency of a data processing system. The present invention is particularly useful in increasing the efficiency of the data processing in network components and integrated circuit components to more efficiently use available bandwidth and improve the functionality of data communication networks. The techniques of the present invention may be utilized in data processing systems or subsystems, as well as in data communication network components such as a router, switch, or server, for example. Thus, a speculatively loaded memory according to the present invention may be employed as a stand alone integrated circuit or, alternatively, may be incorporated as a subsystem into a larger integrated circuit.

Figure 1:
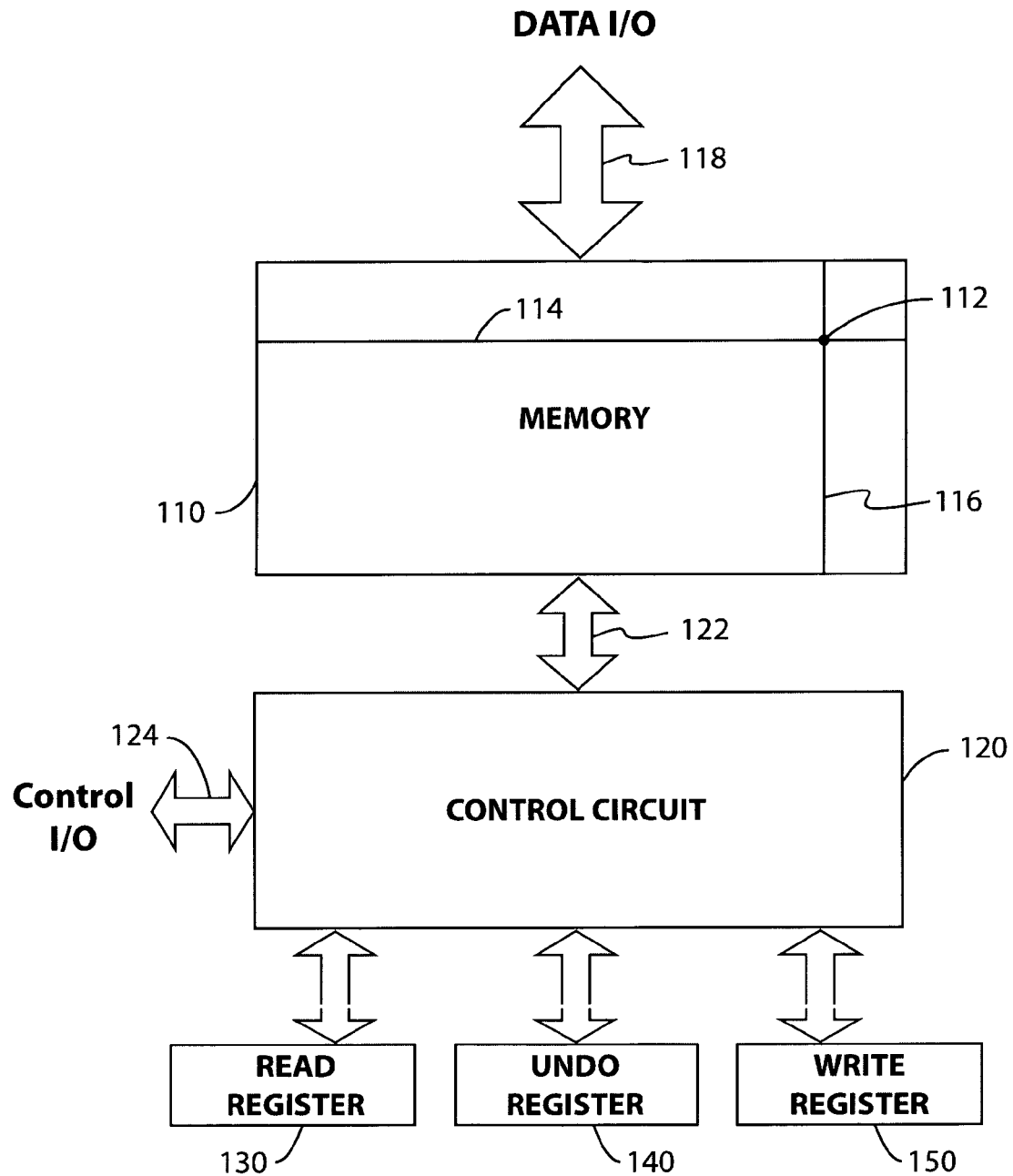
FIG. 1 illustrates a speculatively loaded memory according to one embodiment of the present invention.

FIG. 1 illustrates a speculatively loaded memory according to one embodiment of the present invention. The speculatively loaded memory 100 includes a memory block 110, control circuit 120, and registers 130, 140, and 150. The memory block includes memory cells 112 arranged in rows 114 and columns 116. In one embodiment, each row of the memory block 110 is identified by a unique address. Therefore, data may be read out of the memory or written into the memory over data I/O bus 118 by specifying the particular row address to be read from or written into. A control circuit 120 is coupled to the memory block 110 by memory control bus 122. The control circuit 120 also receives control signals on control signal I/O bus 124. Read and write operations may be controlled by read register 130, write register 150 and undo register 140. For example, read register 130 may be programmed to store an address of the memory block 110. The address stored in the read register 130 may point to an address of the memory where data is to be read. Additionally, write register 150 may be programmed to store an address of the memory block 110. The address stored in the write register 150 may point to an address of the memory where data is to be written.

In one embodiment, the undo register 140 may be programmed to store an address of the memory block corresponding to the start address of the immediately preceding write operation. For example, if the start address in the write register 150 is zero at the beginning of a write operation, then, at the end of the write operation, the undo register will store the address zero (i.e., the start address of the immediately preceding write operation), and the write register will hold a new start address corresponding to the amount of data loaded during the write operation. According to one embodiment of the present invention, the control circuit 120 may receive first and second control signals on control signal I/O bus 124 for controlling the registers 130, 140, and 150. In response to a first state of the first and second control signals, the control circuit 120 may cause the contents of the write register 150 to be stored into the undo register 140. Alternatively, in response to a second state of the first and second control signals, the control circuit 120 may cause the contents of the undo register 140 to be stored into the write register 150. Accordingly, data may be speculatively loaded into the memory block. If the loaded data is subsequently found to be unnecessary, the data may be expunged by simply loading the address of the undo register into the write register.

Figure 2:
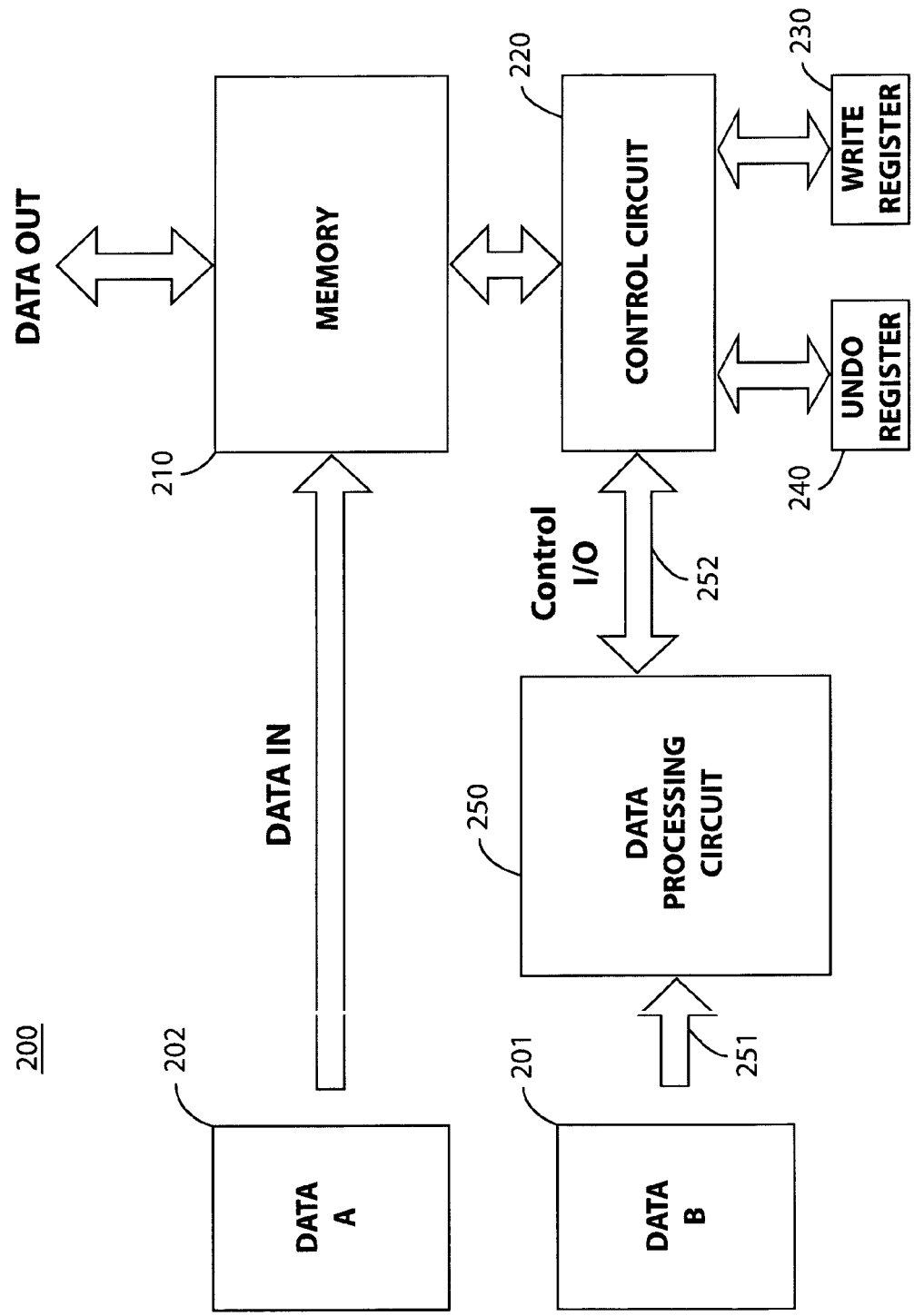
FIG. 2 illustrates the use of a speculatively loaded memory in a data processing system according to one embodiment of the present invention.

FIG. 2 illustrates the use of a speculatively loaded memory in a data processing system according to one embodiment of the present invention. The data processing system 200 includes a memory block 210, control circuit 220, write register 230, undo register 240, and data processing circuit 250. Data element B ("data B") 201 may be received by data processing circuit 250 on data bus 251. Data processing circuit 250 may be used to perform various processing operations on data B such as, for example, a compare operation, digital signal processing operation, or dictionary lookup operation. Therefore, data processing circuit 250 may have a time delay corresponding to a period between the receipt of data B and the completion of the processing operation on data B. Data B has an associated data element A ("data A") 202. The disposition of data A in the system 200 may depend upon the result of the processing operation on data B. For example, data A may be transmitted to another part of the system if the processing operation returns one result. On the other hand, data A may be discarded if the processing operation returns another result. Additionally, the data processing circuit 250 may transmit a result signal on control I/O bus 252 to memory control circuit 220. Therefore, according to one embodiment of the present invention, data A is speculatively loaded into memory block 210 during the execution of the processing operation on data B. Data A is loaded into the memory block 210 beginning at a current start address stored in the write register 230. In one embodiment, the write register is a counter. Therefore, as data A is loaded into the memory block 210, the write register 230 may receive an increment signal to keep track of the address as data A is successively loaded into memory. At the end of a memory write operation, the write register will hold a new address, which is the start address for the next write operation. However, the start address of the immediately preceding write operation (i.e. the data A start address) is stored in the undo register 240. In one embodiment, the data A start address is stored in the undo register 240 at the beginning of a subsequent write operation. However, in other embodiments, the data A start address may be stored in the undo register 240 at the occurrence of other system events. If the processing operation on data B returns a result signal indicating that data A should be transmitted to another part of the circuit (i.e., retained), then signals on the control I/O bus 252 are in a first state. However, if the processing operation on data B returns a result signal indicating that data A should be discarded, then signals on the control I/O bus 252 are in a second state. The signals on the control I/O bus 252 are coupled to control circuit 220. If control circuit 220 receives control signals in a first state at the end of the data processing operation on data B, then the contents of the write register are stored in the undo register. Accordingly, data A is retained for further processing. However, if the control circuit receives control signals in a second state at the end of the data processing operation on data B, then the contents of the undo register are stored in the write register. Accordingly, the next write operation into the memory 210 will occur at the memory address locations where data A is stored, and data A will overwritten and seamlessly discarded.

FIG. 3 illustrates a comparison of the standard open system interconnect networking model and the TCP/IP networking model helpful in understanding the advantages of the present invention in a data communication network application. The standard open system interconnect ("OSI") networking model includes Application Layer 7, Presentation Layer 6, Session Layer 5, Transport Layer 4, Network Layer 3, Data Link Layer 2, and Physical Layer 1. As illustrated in FIG. 3, TCP/IP follows a similar model. The TCP/IP networking model includes Application Layer 5, Transport Layer 4, Internet Layer 3, Media Access Control ("MAC") Layer 2, and Physical ("PHY") Layer 1.

Figure 4:
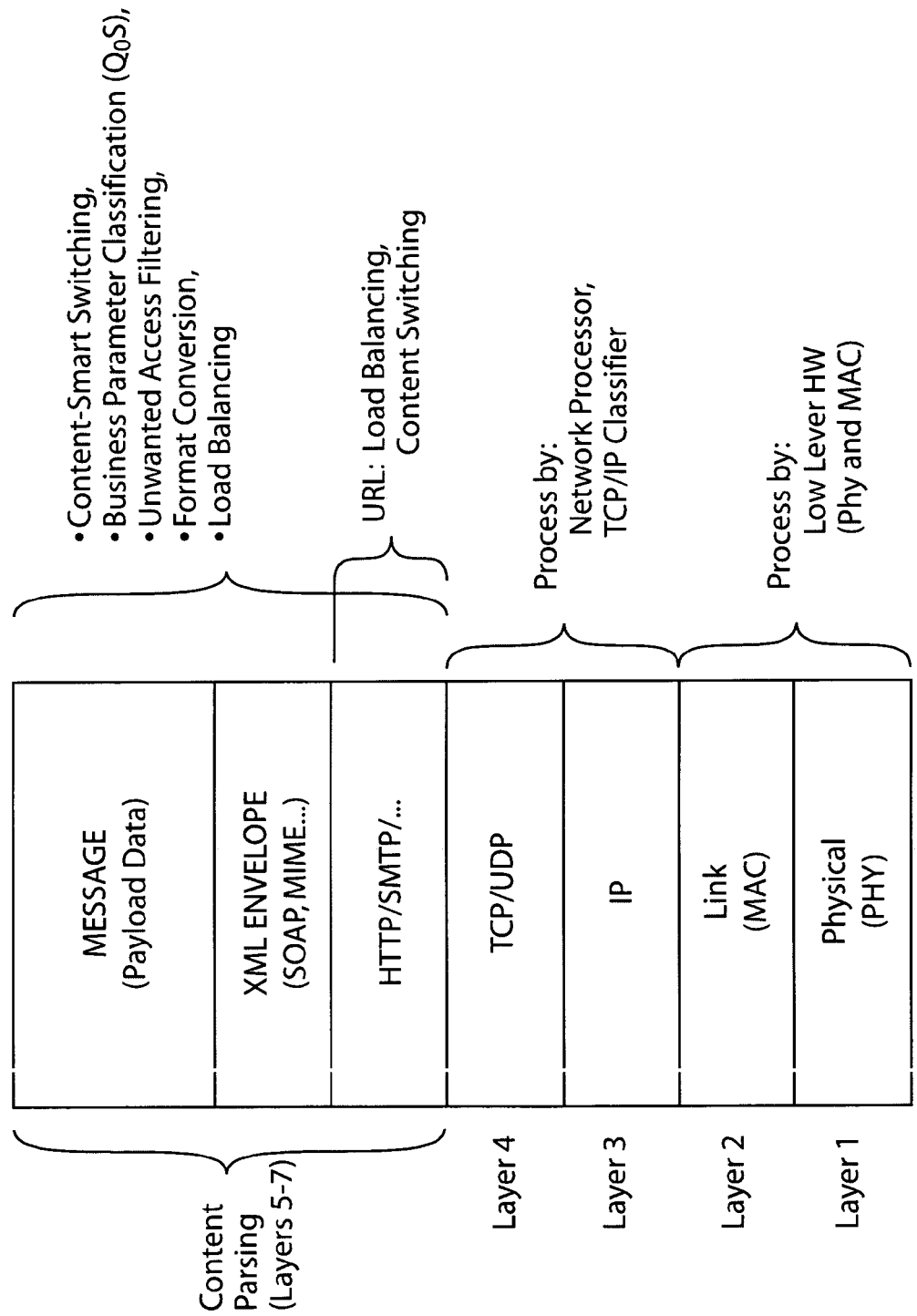
FIG. 4 illustrates sublayers of the TCP/IP networking model.

In practice, the top layer of the TCP/IP model is further divided into other sublayers. FIG. 4 illustrates sublayers of the TCP/IP networking model. Layers 1–4 of the TCP/IP model are the same as in FIG. 3. Namely, layer 1 is the physical layer, layer 2 is the MAC (i.e., Link) layer, layer 3 is the internet protocol ("IP") layer, and layer 4 is the Transmission Control Protocol ("TCP") and User Datagram Protocol ("UDP") layer. However, FIG. 3 illustrates how information is distributed across TCP/IP layers 5, 6, and 7. Layer 5 may contain Hypertext Transfer Protocol ("HTTP") information, Simple Mail Transfer Protocol ("SMTP") information, or File Transfer Protocol ("FTP") protocol information, for example. Layer 6 may contain ebXML, simple object access protocol ("SOAP"), or other extended markup language ("XML"). Layer 7 generally contains the message payload. In some embodiments layer 6 may not exists. In that case, only layer 5 information such as HTTP and the message payload of layer 7 will be present.

Unlike layers 1–3, which carry binary or hex intensive protocols such as TCP or IP, layers 5–7 carry string intensive protocols. A string, or character string, is defined as a data structure composed of a sequence of characters that typically represent human readable text, and may be interpreted by a computer as text rather than as numbers. A string may contain any sequence of elements from a given character set, such as letters, numbers, control characters, ASCII, or extended ASCII. A character, on the other hand is a letter, number, punctuation mark, or other symbol or control code that may be represented to a computer by one unit (e.g., 1 byte) of information. Therefore, layers 1–3 implement the low level coding for implementing and facilitating the transfer of information between computers on a network. On the other hand, layers 5–7 contain the content of the actual information for the application or applications. The layer 5–7 data is primarily in string format and may be of variable lengths depending upon the application or type of transaction.

A memory according to one embodiment of the present invention is speculatively loaded with first string data corresponding to layers 5–7 while an associated second string data is processed by a data processing circuit. The first string data stored in the memory may be associated with the second string data that requires simultaneous processing by the data processing circuit in another part of the system. The first and second string data may be associated because the results of the data processing on the second string data may control the disposition of the first string data. For example, in one embodiment, the string data stored in the memory corresponds to header data, and the string data being processed corresponds to tag data. Such data may be referred to as associated data because header data and tag data may be part of one data structure, or because the results of the tag data processing may influence the processing of the header data. Accordingly, the results of the tag string data processing may trigger the memory to carry out various types of processing on the header string data. In one embodiment, the header string data is speculatively loaded into a memory while the tag string data is processed by a dictionary lookup unit. If a string matching the tag string data is found in the dictionary lookup unit (i.e., a match), then the header string data is transmitted to another memory. However, if a string matching the tag string data is not found (i.e., no match), then the header string data is discarded, and the memory is reset to a previous state. Speculatively loading a memory according to embodiments of the present invention has the unique advantage of allowing the data processing system to load data into a memory for transfer to another part of the system before the associated data (e.g. the tag string data) has been completely processed. This allows other upstream processing elements to free up resources for incoming data. Of course, it is to be understood that the advantages of the present invention also apply to other types of associated data other than string data.

Figure 5:
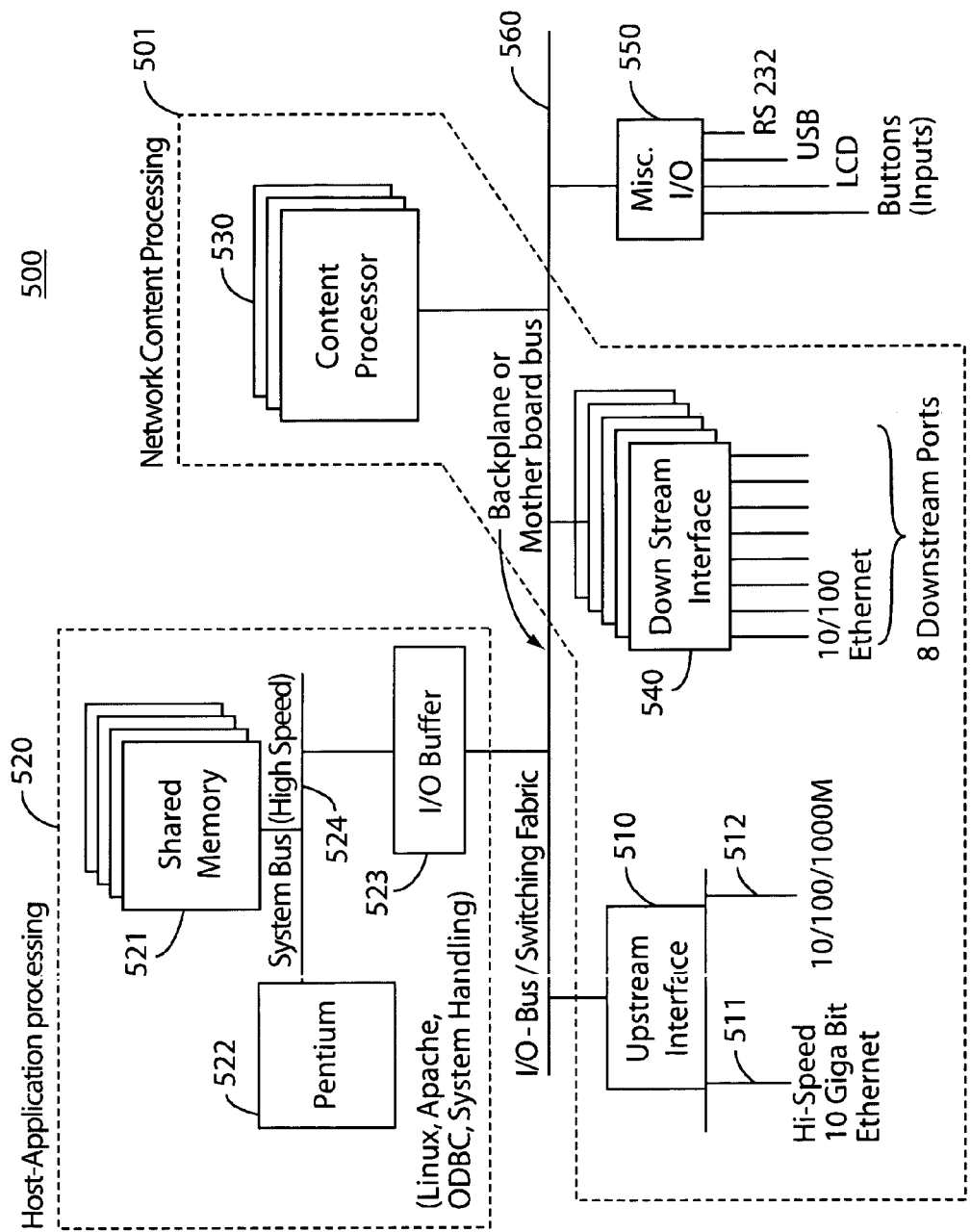
FIG. 5 illustrates a system including a content processor that utilizes a speculatively loaded memory in accordance with one embodiment of the present invention.

FIG. 5 illustrates a network processing system 500 including a content processor 530 that utilizes a speculatively loaded memory in accordance with one embodiment of the present invention. The network processing system 500 includes a host application processor 520, a network content processing system 501, an input-output bus 560, and input-output interface units 550. The network content processing system 501 includes content processor 530, upstream interface 510, and down stream interface 540. The upstream interface 510, host application processor 520, content processor 530, down stream interface 540, and input-output interface units 550 are coupled together by the input-output bus 560.

Network data is received from an external network in the upstream interface unit 510. The upstream interface unit 510 may include a Hi-Speed 10 Giga Bit Ethernet input or 10/100/1000 M Ethernet input 512, for example. The upstream interface unit is coupled to input-output bus 560. Data received in the upstream interface unit 510 may be transmitted to the input-output bus 560 for transmission to the content processor 530. According to one embodiment of the present invention, the content processor 530 receives network data from the upstream interface and executes parsing and classification operations on the level 5–7 string data within the network data. The results of the parsing and classification operations may be used to control the flow of information in the network. Additionally, the host application processor 520 includes a microprocessor 522 (e.g., Pentium) which may be running on a Linux operating system, for example. The host application processor 520 also includes shared memory 521, and I/O buffer 523 coupled together by host processor bus 524 which may be a high speed system bus, for example. The I/O buffer 523 couples the host application processor 520 to the input-output bus 560. The host processor may be used to configure and control the network content processing system 501 and thereby control the flow of data through the network.

Figure 6:
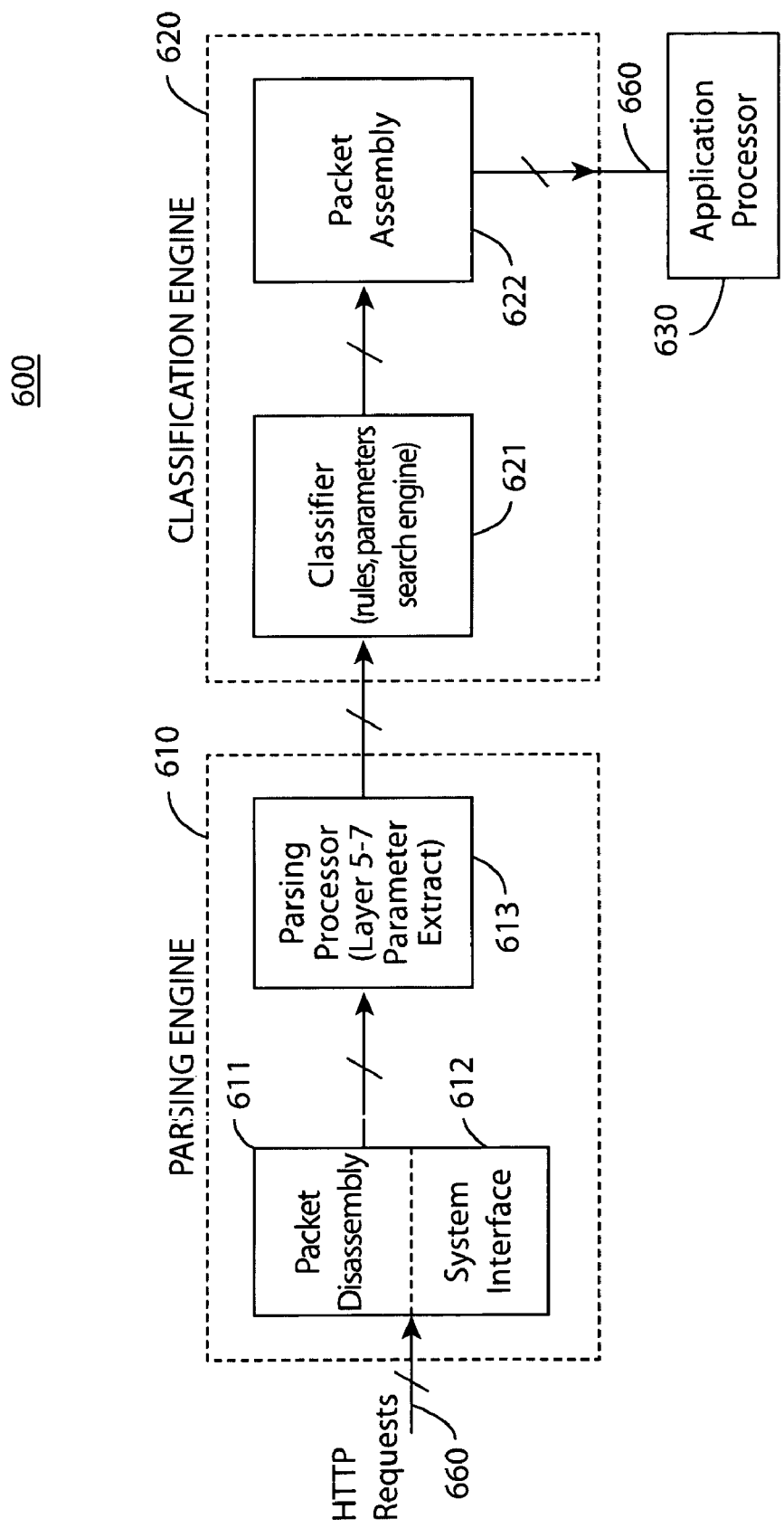
FIG. 6 illustrates a functional block diagram of a content processor according to one embodiment of the present invention.

FIG. 6 illustrates a functional block diagram of a content processor 600 according to one embodiment of the present invention. The content processor 600 includes a parsing engine 610 (i.e., a parser) and a classification engine 620. Network data is transmitted to the content processor 600 from the input-output bus 660 and received in parser 610. In one embodiment, the network data transmitted to the parser 610 includes HTTP requests. The network data is received in the parser 610 under the control of the parser system interface unit 612. The system interface unit 612 may receive data on the input-output bus and transmit the data on an internal content processor bus ("CP bus"). The network data is disassembled in packet disassembly unit 611 and transmitted to the parsing processor 613. The parsing processor 613 extracts parameters from layers 5–7 of the network data. The parsed network data is then transmitted to the classification engine 620. The classification engine 620 includes a classifier 621 and packet assembler 622. The data is then reassembled into packets and transmitted to the host application processor 630 over input-output bus 660.

Figure 7:
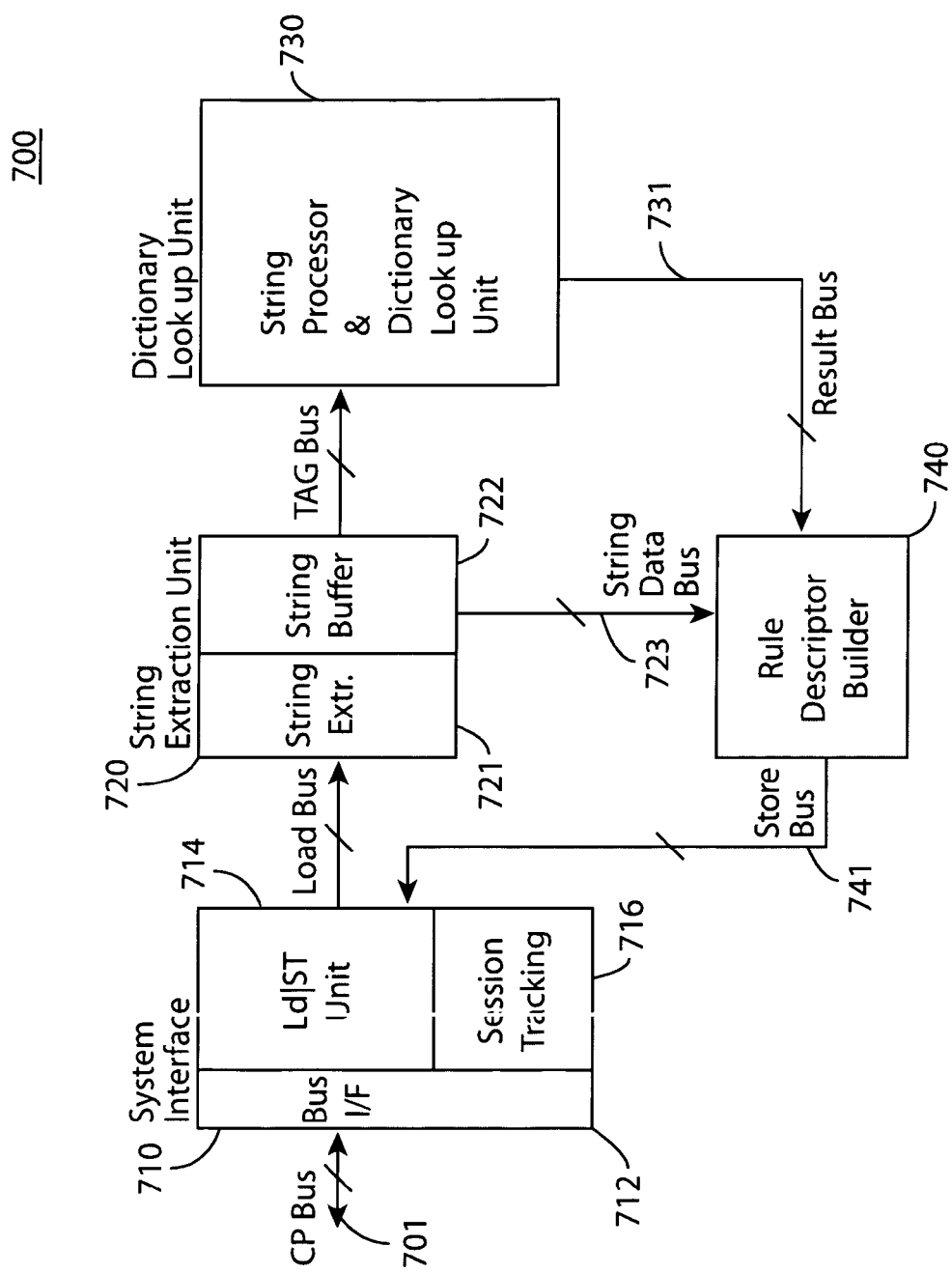
FIG. 7 illustrates a functional block diagram of a parsing engine according to one embodiment of the present invention.

FIG. 7 illustrates a functional block diagram of a parser 700 according to one embodiment of the present invention. The parser 700 includes a system interface unit 710, a string extraction unit 720, a dictionary lookup unit 730, and a descriptor builder 740. The system interface unit 710 includes a content processor bus interface ("CP bus interface") 712, a load/store unit 714, and a session tracking unit 716. The system interface unit 710 is used to interface the internal resources of the parser with external content processor system components through the CP bus 701. Data received by the system interface unit 710 is loaded into the string extraction unit 720. The string extraction unit 720 includes a string extractor 721 and a string buffer 722. The string extractor 721 receives string data and searches through the string data for string delimiters. A string delimiter may include a character marking the beginning or end of a unit of data.

In one embodiment, the string extractor parses the input data and extracts tag string data. Tag string data may include one or more characters containing information about a file, record type, or other data structure. For example, in markup languages such as HTML, SGML, or XML, a tag may be a code that identifies an element in a document used for formatting, indexing, and linking information in the document. Additionally, the string extractor may parse the input data and extract header string data. The extracted tag string data and header string data are then passed to the string buffer 722. The tag string data may then be transmitted to the dictionary lookup unit 730.

The dictionary lookup unit 730 checks the extracted tag string data against elements in a dictionary and returns a match signal and a code word on search result bus 731. The information on the search result bus 731 is transmitted to the descriptor builder 740. The descriptor builder also receives the header string data on string data bus 723. The descriptor builder forms the result header descriptor, defined in more detail below, for software running on the host application processor. The result header descriptor and the header string data are transmitted from descriptor builder 740 over store bus 741 to the system interface unit 710 for storage in external CP memory.

Figure 8:
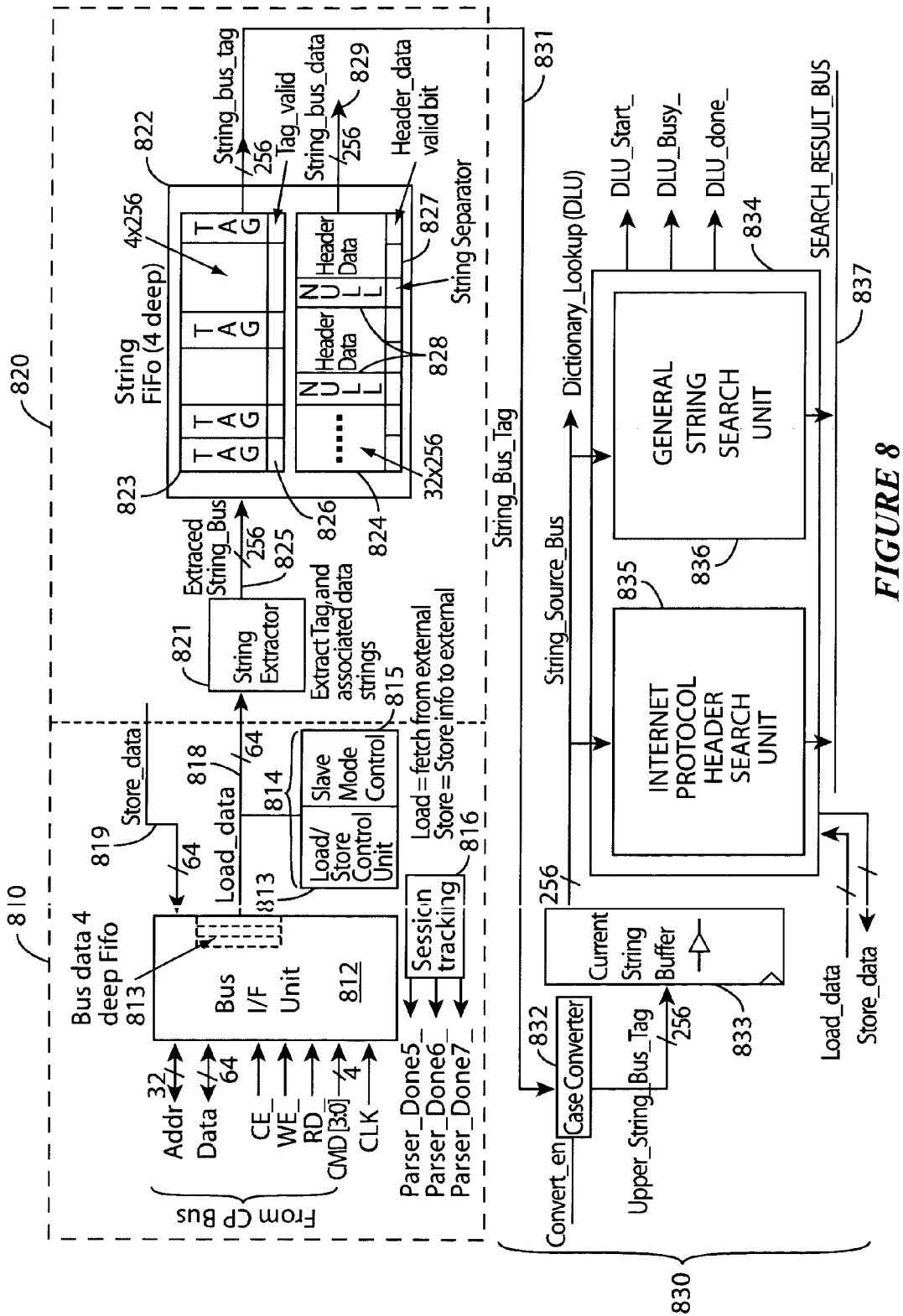
FIG. 8 is a block diagram illustrating a system interface unit, string extraction unit, and dictionary lookup unit utilized in a parsing engine according to one embodiment of the present invention.

FIG. 8 is a more detailed block diagram illustrating a system interface unit 810, string extraction unit 820, and dictionary lookup unit 830 utilized in a parsing engine according to one embodiment of the present invention. The system interface unit 810 includes a CP bus interface 812, load/store unit 814, and session tracking unit 816. The CP bus interface 812 is coupled to the CP bus to receive signals Addr (e.g., a 32-bit address), Data (e.g., a 64-bit data signal), CE_ (e.g., chip enable), WE_ (e.g., write enable), RD_, CMD(3:0) (e.g., a 4-bit parser command line), and CP bus clock CLK. The CP bus interface 812 may perform all the slave mode and master mode accesses for the parser one CP bus clock at a time. In one embodiment, the CP bus interface 812 includes protocol and command decoding logic (not shown) for decoding the commands and protocol information received from external resources. For example, the parser may receive information indicating that the data to be parsed is formatted in a particular protocol out of a range of protocols (e.g., HTTP, SMTP, FTP, DNS, SSL, POP3, or XML). In one embodiment, the CP bus interface 812 may also include a bus data FIFO 813 (i.e., first-in first-out memory). The FIFO may be used for temporarily storing information after reception or prior to transmission. Furthermore, the CP bus interface may be coupled to a load bus 818 and a store bus 819. The load bus 818 and store bus 819 are used to transmit data to and from internal resources of the parser.

The system interface unit 810 may also include a load/store unit 814 to control the interface between external resources and the parser. The load/store unit 814 includes a load/store controller 813 and a slave mode controller 815. The load/store unit may control the transfer of large data blocks to and from the parsers internal memory buffers. Additionally, the load/store unit loads the message payload (i.e., unparsed network data) from resources external to the parser. The load/store unit then forwards the payload to the string extraction unit 820 for downstream processing. Furthermore, the load/store unit controls the external storage of result data from the descriptor builder (not shown). In one embodiment, the load/store unit operates in a burst access mode to perform its functions more efficiently. The load/store unit slave mode controller 815 controls the master/slave operations of the system interface unit. For example, the parser may be put in a slave mode to allow external resources to configure or pre-load information into the parsers internal memory buffers or programmable configuration registers (not shown). In one embodiment, the system enters a slave mode to allow software running on the host application processor to check the parser's status and check for errors.

The system interface unit 810 also includes a session tracking unit 816 to track the duration and status of a parsing operation in the parser. In one embodiment, the parser operates on one layer of the unparsed network data at a time (i.e., one protocol at a time). Therefore, the parser may track the byte count of the layer or layers until the parser has completed the parsing operation on each layer (e.g., layers 5, 6, and 7). The session tracking unit may also include multiple state machines for tracking each layer separately. In parsing the HTTP layer, for example, a "content length" value may be 1400 bytes. The session tracker may track the parsing operation until all the 1400 bytes are completed. In some embodiments, there may be embedded layers within a layer. For example, an ebXML layer within an HTML layer. In this case, the session tracker will also track the parsing operation for the inner layer. After the parsing operation is completed, the session tracker asserts a "parser done" signal to indicate that the parser has completed the corresponding session. In one embodiment, there are three parser done signals. Parser_done5_ is asserted when layer 5 is completed, parser_done6_ is asserted when layer 6 is completed, and parser_done7_is asserted_ when layer 7 is completed.

The string extraction unit 820 includes a string extractor 821 and a header string memory buffer ("string buffer") 822. In one embodiment, the string buffer is a first-in first-out memory (i.e., a string FIFO). The string extractor 821 is coupled to the load bus 818 to receive the unprocessed network data from the system interface unit 810. For example, the load bus may be a 64-bit bus. Accordingly, the string extractor 821 will accept 64-bits of unparsed network data at a time. As mentioned above, the string extractor 821 receives string data and searches through the string data for string delimiters. A string delimiter may include a character marking the beginning or end of a unit of data. The string extractor 821 may include multiple algorithms for extracting strings from different data protocols. For example, an incoming string may be an HTTP string having ":" as a separator. On the other hand, the incoming string may also be an XML protocol string having a hierarchical structure. The incoming string may also be a uniform resource locator ("URL") string. URL's are addresses for resources on the internet and may specify the protocol to be used in accessing the resource (e.g., HTTP or FTP), the name of the server on which the resource resides (e.g., www.website.com), and the path to a resource (e.g., an HTML or XML document on that server). Accordingly, the string extractor 821 may be required to parse a variety of different types of string delimiters. In one embodiment, the string extractor may be required to search through a string for delimiters such as "space", ":", "<", or ">." For example, if the string "<header>" was received as an input, the string extractor may return the string "header." Similarly, if the string "content-type:" was received as an input, the string extractor may return the string "content-type." Furthermore, if the string "content-length: 5678" was received as an input, the string extractor may return the tag string "content-length" and a header string "5678." Accordingly, the tag string data and header string data are associated data elements. It is to be understood that the above examples are merely illustrative of possible embodiments. Accordingly, other embodiments of the string extractor may receive other delimiter strings or return other sting extractor results, or both. Therefore, the string extractor of the present invention may include a plurality of algorithms implemented as state machines for parsing the different types of string data and returning a variety of string extractor results according to the requirements of the particular application.

The extracted tag string data and header string data may then be passed to the string buffer 822. In one exemplary embodiment, the string buffer 822 is a first-in first-out memory ("string FIFO") that may include a tag FIFO 823 and a header FIFO 824. For example, the string FIFO may include a 4 deep tag FIFO organized as 4×256+1 (i.e., 256 bits and a tag valid bit). Additionally, the header FIFO section may be organized as 32×257. Once the string extractor has searched through an input and returned a result string, the string extractor output may be transmitted to string buffer 822 over string bus 825. If the result string is a tag string, then the string extractor transmits the tag string data to the tag FIFO and activates a valid bit in a tag_valid field 826. If the result string is a header string, then the string extractor transmits the header string data to the header FIFO and activates a valid bit in a header_valid field 827. Furthermore, the header FIFO 824 may include a string separator section 828 (e.g., a NULL string) inserted between header string data in order to separate the header string data associated with one tag from the header string data associated with other tags. Additionally, one tag may be associated with multiple header string data. The valid bit corresponding to the string separator section 828 is inactivated. The tag string data in the tag FIFO may be transmitted to the dictionary lookup unit 830 over tag string bus 831. Additionally, header string data in the header FIFO may be transmitted to the descriptor builder over header string bus 829. In one exemplary embodiment, the tag string bus 831 and header string bus 829 are 256-bit buses. However, it is to be understood that other variations or sizes for the buses 829 and 831 and string buffer 822 could be used. The advantages of the present invention include allowing for the speculative loading of the header string data while the tag string data is being processed. This advantageously allows the string extractor, which is an upstream resource, to load the next strings into the string FIFO without having to wait for the tag string processing results.

In one embodiment, the dictionary lookup unit ("DLU") 830 includes a DLU memory array 834. The DLU memory array may be a synchronous memory, for example. The DLU may receive one valid tag string data from the tag FIFO section 822 at a time. The tag string data may then be input to the DLU memory array 834 and compared with the elements of the DLU memory array. If a match is found, the DLU produces a match result signal ("match signal") and a code word on search result bus 837. The match signal and code word are then transmitted to the descriptor builder (not shown). The DLU may also include DLU status signals DLU_start_ (i.e., initiate DLU search), DLU_busy_ (i.e., DLU search in progress), and DLU_done_ (i.e., DLU search complete). These signals may be utilized by other parts of the parser for interfacing with the operations of the DLU. In one embodiment, the DLU supports 8 concurrent protocols simultaneously. For example, the DLU may include HTTP, SMTP, ebXML, SSL, POP3, DNS, FTP, and a general purpose lookup table. A multiple protocol support embodiment is illustrated by internet protocol header search unit 835. In another embodiment, the DLU may be configured as a general purpose string search engine. This alternative embodiment is illustrated by general string search unit 834. In one exemplary embodiment, the DLU may include a case converter 832 and string buffer 833. Accordingly, the tag string would be converted to upper case in the case converter and subsequently transmitted to the string buffer to await processing by the DLU memory array. The DLU may also include load_data and store_data lines for preloading information and monitoring status of the lookup operations.

Figure 9:
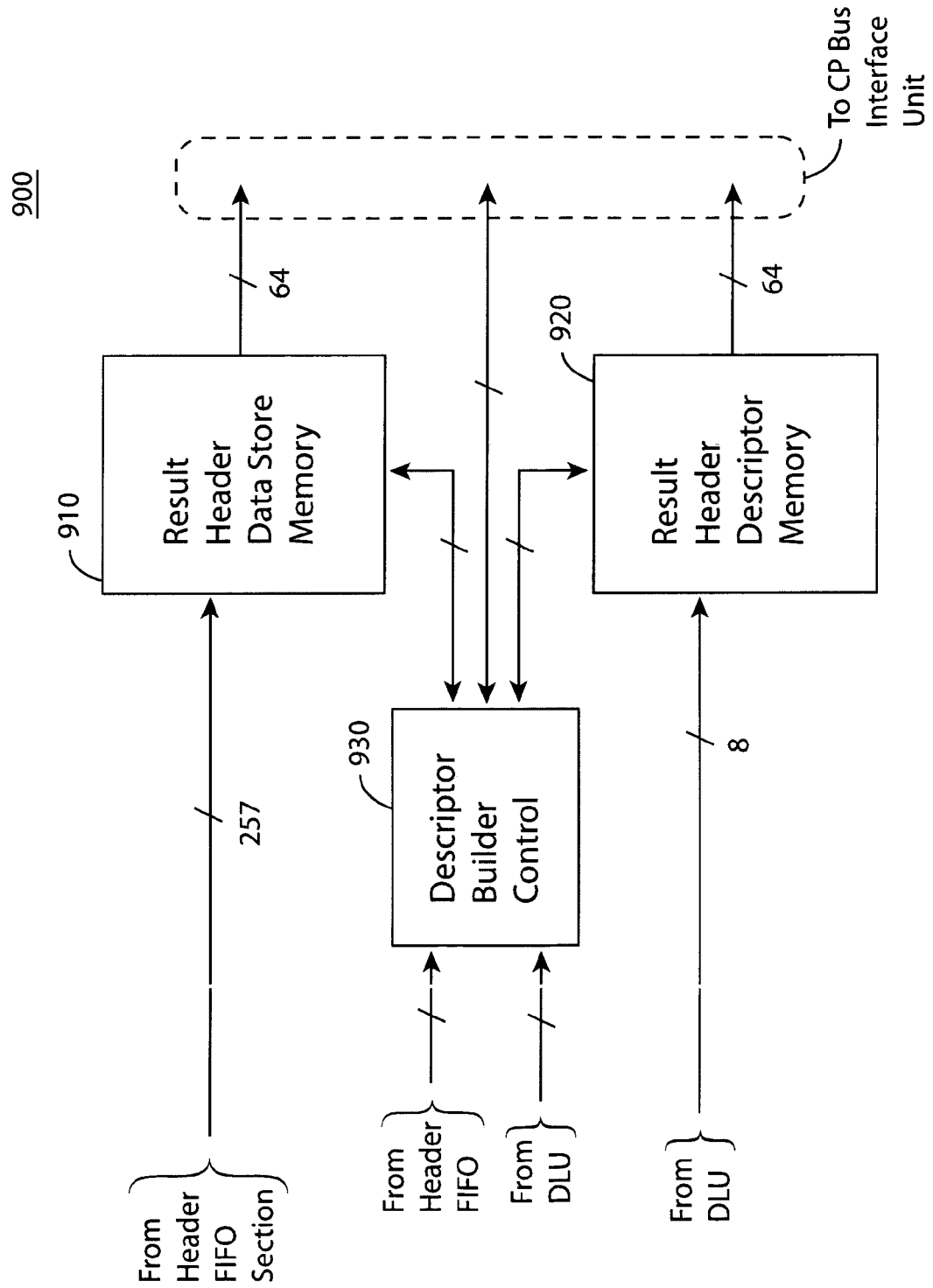
FIG. 9 is a block diagram illustrating a descriptor builder utilized in a parsing engine according to one embodiment of the present invention.

FIG. 9 is a block diagram illustrating a descriptor builder 900 utilized in a parsing engine according to one embodiment of the present invention. The descriptor builder 900 includes a result header data store ("RHDS") memory 910, a result header descriptor ("RHD") memory 920, and a descriptor builder control unit 930. The descriptor builder 900 generates parser output data structures for a parsing operation. The RHDS memory 910 is coupled to receive the header string data and valid bit from header FIFO 824 of FIG. 8. The header string data may then be transmitted to CP bus interface unit 812 under the control of the descriptor builder control unit 930. The RHD memory 920 receives a code word result from the DLU if the tag string data, corresponding to the header string data in the RHDS memory 910, matches one of the elements of the DLU (i.e., if the DLU returns a match signal). The RHD memory 920 also receives an address pointer (discussed below) from the descriptor builder control unit 930. The contents of the RHD memory 920 may subsequently be transmitted to CP bus interface unit 812 under the control of the descriptor builder control unit 930.

Figure 10:
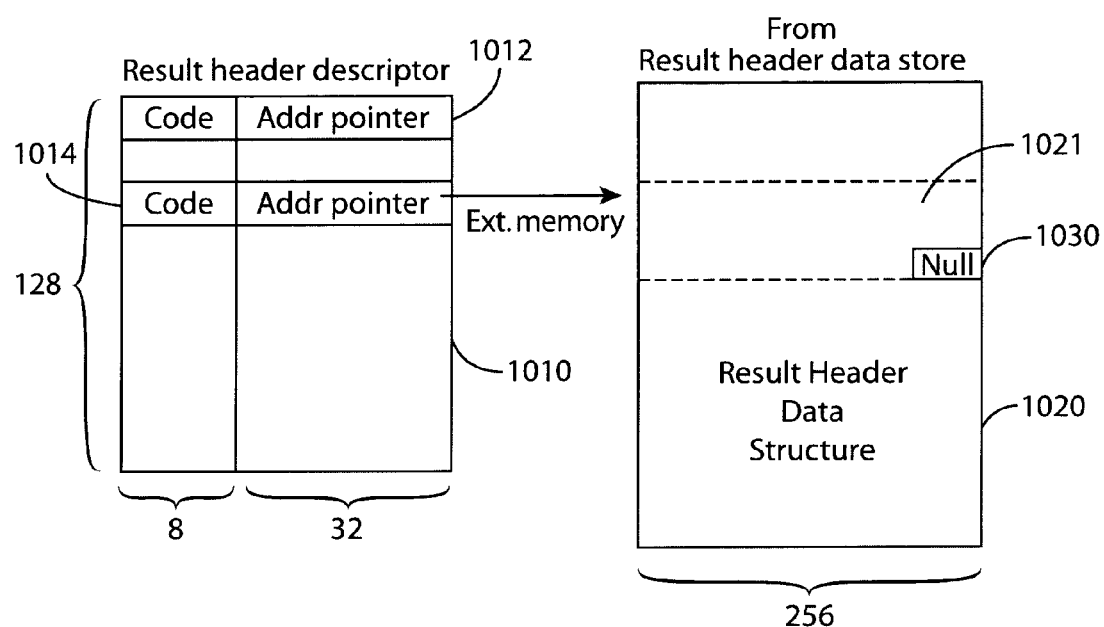
FIG. 10 illustrates a data structure generated by the parser after a parsing operation according to one embodiment of the present invention.

The data structure generated by the parser after a parsing operation according to one embodiment of the present invention is shown in FIG. 10. The first part of the parser output data structure is a result header descriptor 1010. The result header descriptor is a 128×40 data structure. Each element of the result header descriptor 1010 includes a code word field 1014 and an address pointer field 1012. The code word is the value returned by the DLU if tag string data matches one of the tags in the DLU. For example, the code word may be an 8-bit code corresponding to a protocol tag string. The address pointer field 1012 is a pointer to the start location of the header string data in external memory. For example, the address pointer may be a 32-bit CP memory address where the header string data, corresponding to the particular tag and code word, may be stored by the parser. Therefore, the result header descriptor 1010 may contain up to 128 code words and address pointers that indicate the location of the header string data corresponding to each tag. The result header descriptor data structure 1010 may be initially generated in the RHD memory 920 of FIG. 9 during a parsing operation on a given layer. The result header descriptor 1010 may then be moved to external memory (e.g., CP memory) after the parser has completed parsing the layer or when the RHD memory 1020 is full.

The second part of the parser output data structure is the result header data structure 1020. The result header data structure 1020 is created by the parser in an external memory and includes the header string data 1021 corresponding to each code word in the result header descriptor 1010. The header string data is speculatively loaded from the header FIFO 824 of FIG. 8, into the RHDS memory 910 in the descriptor builder 900, and subsequently into external memory (e.g., CP memory) on the occurrence of a match signal from the DLU. The header string data 1021 in external memory is accessible by the address pointers 1012 in the result header descriptor 1010. Each header string data has a NULL string 1030 appended at the end to indicate the end of the header string data associated with that code word. The starting address pointer, indicating the start address of the header string data in external memory, may be specified by software in a configuration register (e.g., in the load/store unit 814). Accordingly, the address pointer 1012 may be generated by the load/store unit 814 of FIG. 8 by transmitting the start address pointer value in the configuration register to the descriptor builder control unit 930. The descriptor builder control unit 930 may then forward the start address pointer value to the result header descriptor 1010, in RHD memory 920, before the result header descriptor is subsequently loaded into external memory.

Referring again to FIGS. 8 and 9, when the DLU unloads the tag string data from the tag FIFO 823, the descriptor builder 900 may also unload the corresponding header string from the header FIFO 824 into RHDS memory 910. Additionally, each tag string data may have multiple associated header string data, which may also be unloaded into the RHDS memory 910. If the DLU returns a match signal, the header string data should be retained and transmitted to the result header data structure in external memory. If the DLU does not return a match signal, then the header string data should be ignored. Therefore, according to one embodiment of the present invention, the header string data may be speculatively loaded into the RHDS memory 810 while the corresponding tag string data is processed by the DLU. If the DLU returns a match signal, the header string data is transmitted from the RHDS memory 810 to external CP memory, and the start address pointer in the result header descriptor 912 is programmed to the start address of the header string data in CP memory. However, if the DLU does not return a match, a RHDS memory 810 according to one embodiment of the present invention discards the header string data associated with the tag string data in the DLU. The techniques of the present invention are advantageous because the speculative loading of header string data, which is associated with the tag string data, allows space in the string FIFO 822 to be freed up to receive additional upstream inputs from the string extractor. Thus, the processing efficiency of the data processing system is increased. Of course, it is to be understood that speculative loading of data according to embodiments of the present invention may be advantageous in other systems as well.

Figure 11:
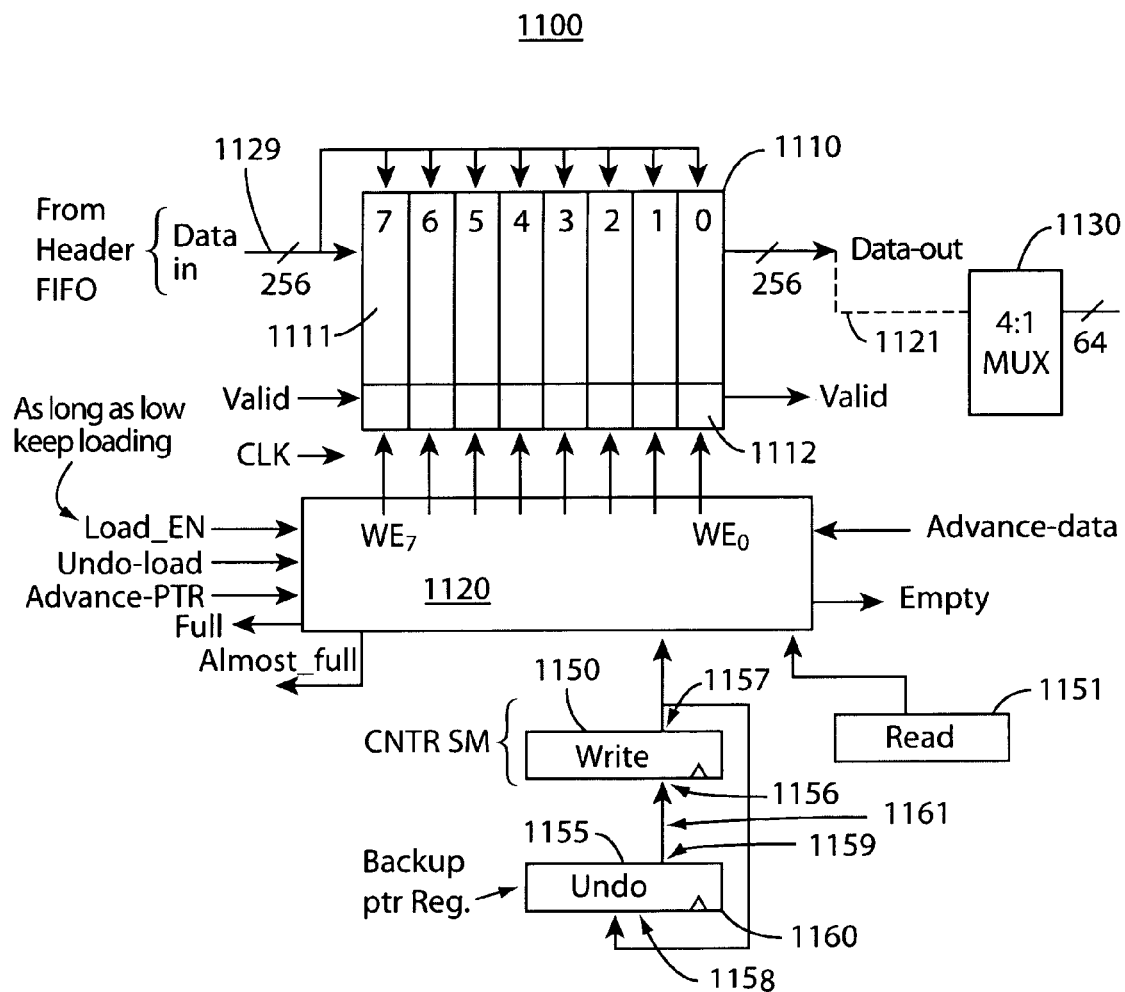
FIG. 11 illustrates a speculatively loaded memory that may be utilized in the result header data store memory according to one embodiment of the present invention.

FIG. 11 illustrates a speculatively loaded memory 1100 that may be utilized in the RHDS memory 810 according to one embodiment of the present invention. The speculative memory includes a memory block 1110, a memory control unit 1120, and an output multiplexor 1130. The memory block 1110 is divided into rows and columns of memory cells. Each row in the memory block may be identified by an address. For example, memory block 1110 may include 8 rows 1111 each having a unique address (e.g., memory addresses 0–7). Each row may be 256 bits wide (i.e., 256 columns). Header data strings may be received in memory block 1110 on header string bus 1129. Each row 1111 in the speculative memory 1100 may also include a valid bit 1112.

The memory control unit 1120 receives control signals load_EN and advance_data. When memory control unit 1120 receives a load_EN signal, data on header string bus 1129 is written into memory block 1110. Memory control unit 1120 is coupled to a write register 1050 that is loaded with an address of the memory block. The data on the header string bus 1129 may be written into the memory block at the address held in the write register. In one embodiment the write register is a counter that receives an increment signal as data is loaded into the memory block. Alternatively, when memory control unit 1120 receives a advance_data signal, data in memory block 1110 is read from the memory on data out bus 1131. Memory control unit 1120 is also coupled to a read register 1151 that is loaded with an address of the memory block. Data on the header string bus 1129 may be read from the memory block at the address held in the read register. In one embodiment the read register is a counter that receives an increment signal as data is read out of the memory block.

Memory control unit 1120 also receives control signals advance_PTR ("advance signal") and undo_load ("undo signal"). In one embodiment, the advance_PTR and undo_load control signals are used to control the loading of addresses in the write register 1150 and an undo register 1155. At the beginning of a memory write operation, the write register may be loaded with an initial start address for the immediately subsequent write operation. When the immediately subsequent write operation is completed, the write pointer will be loaded with a modified start address, indicating where data will be written to in the next write operation. For example, if the initial start address is the address for row 2, then data will be written into the memory block beginning at row two. As data is written into the memory, the write register may be incremented as rows are filled. If rows 2, 3, and 4 are filled by the write operation, then the modified start address will indicate row 5. Undo register 1055 is used to hold the address of the immediately preceding write operation. Thus, the undo register will be loaded with the start address for row 2 as a result of the above mention write operation. In one embodiment, the start address for a write operation may be stored into the undo register at the beginning of each write operation. After the write operation is complete, the memory control unit may be required to update either the write register or the undo register before the next write operation.

While the advance signal and undo signal are in an inactive state, the control circuit 1120 will maintain the values loaded into the write and undo registers. However, if the advance signal enters an active state, then the address in the write register 1150 is stored into the undo register 1155. An active advance signal may be received if, for example, the DLU transmits a "match" signal on the result bus. Accordingly, the header string data speculatively loaded into the memory block 1120 may be retained for further processing. On the other hand, if the undo signal enters an active state, then the address in the undo register 1155 is stored into the write register 1150. An active undo signal may be received if, for example, the DLU transmits a "no match" signal on the result bus. Accordingly, next subsequent memory write operation will begin at the start address for the immediately preceding write operation. As a result, the header string data speculatively loaded into the memory block 1120 will be overwritten, and thus discarded. It is to be understood that the above signaling scheme is illustrative of the operation of the speculatively loaded memory, and that other signaling schemes for controlling the memory and loading the write and undo registers could also be used.

In one embodiment, the write register includes a write data input 1156 and a write data output 1157. Additionally, the undo register may include an undo data input 1158 and an undo data output 1159. In one exemplary embodiment, the write data input is coupled to the undo data output by a data bus 1160, and the write data output is coupled to the undo data input by a data bus 1161. Address values in the write and undo registers may be transferred between the registers by activating load input enable lines for each register (not shown).

In one embodiment, the memory control circuit 1120 includes a full signal, almost_full signal, and empty signal. The memory control circuit 1120 may assert the full signal when the write address is equal a last row address in the memory block. Additionally, the memory control circuit 1120 may assert the almost_full signal when the write address is equal to a predefined intermediate row address in the memory block. Furthermore, the memory control circuit 1120 may assert the empty signal when the write address is equal a first row address in the memory block. In another embodiment, the memory control circuit 1120 may include a reset signal for initializing the read, write, and undo registers. The reset signal may be coupled to the read register, write register, and undo register. When the reset signal is in an active state, the read, write, and undo registers may be set to the same initial address.

Figure 12:
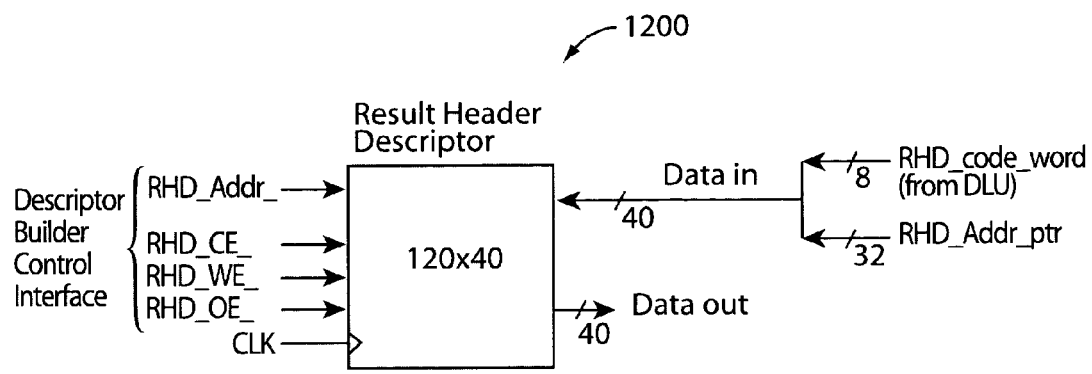
FIG. 12 illustrates a result header descriptor memory according to one embodiment of the present invention.

FIG. 12 illustrates a result header descriptor ("RHD") memory 1200 according to one embodiment of the present invention. The RHD memory 1200 may be a 128×40 memory array. The RHD memory array may receive the result header descriptor code word from the DLU (e.g., an 8-bit RHD_code_word). Additionally, the RHD memory may receive an address pointer value. The address pointer value may be a 32-bit address indicating the external memory location of the header string data corresponding to a particular code word. The RHD memory may also receive control signals from the descriptor builder control unit 830 of FIG. 8. The control signals may include memory address signals RHD_Addr, chip enable signal RHD_CE_, write enable signal RHD_WE_, and output enable signal RHD_OE_. The RHD memory may also receive a clock signal CLK. Data in the RHD memory may be transmitted to the CP interface unit 712 of FIG. 7 on a data out line. In one embodiment, the data out line is a 40-bit data line.

Figure 13:
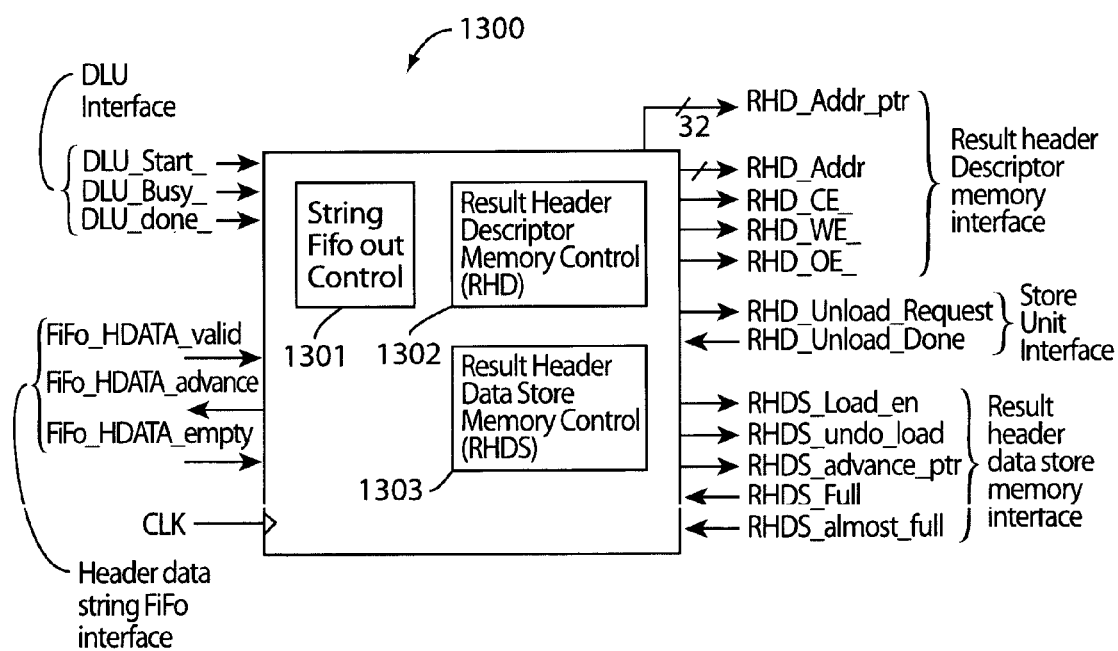
FIG. 13 illustrates a descriptor builder control unit according to one embodiment of the present invention.

FIG. 13 illustrates a descriptor builder control unit 1300 according to one embodiment of the present invention. The descriptor builder control unit 1300 includes a result header descriptor memory control unit ("RHD control") 1302, a result header data store memory control unit ("RHDS control") 1303, and a string FIFO out control unit 1301 for controlling the loading of the header string data from header FIFO 724 of FIG. 7. The RHD control unit 1302 may receive DLU status signals DLU_start_, DLU_busy_, and DLU_done_. Additionally, the RHD control unit may include header FIFO interface signals FIFO_HDATA_VALID (e.g., the header valid data bit), FIFO_HDATA_ADVANCE (e.g., a header FIFO advance signal), and FIFO_HDATA_EMPTY (e.g., a header FIFO empty signal). Furthermore, the RHD control unit may interface with the result header descriptor ("RHD") memory with signals RHD_ADDR_PTR (e.g., the address pointer to external memory), RHD_ADDR (e.g., the storage address in RHD memory), RHD_CE_ (e.g., enable), RHD_WE_ (e.g., write enable), and RHD_OE_ (e.g., output enable). The result header data store ("RHDS") memory 810 of FIG. 8 also interfaces with the RHD control unit 1300 over signal lines RHDS_LOAD_EN, RHDS_UNDO_LOAD, RHDS_ADVANCE_PTR, RHDS_FULL, and RHDS_ALMOST_FULL. Moreover, data in the RHDS memory 810 and RHD memory 820 may be transmitted to external memory by RHD control unit signals RHD_UNLOAD_REQUEST and RHD_UNLOAD_DONE, which are coupled to the system interface unit 710.

Having fully described alternative embodiments of the present invention, other equivalent or alternative techniques for speculatively loading a memory with undo capability according to the present invention will be apparent to those skilled in the art. Accordingly, the embodiments disclosed above should be considered illustrative and not limiting when considered in light of the attached claims.

What is claimed is:

1. A method of processing data comprising:
    loading first data into a memory during a first write operation, wherein the first data is loaded into the memory beginning at a first address stored in a write register and undo register;
    incrementing the write register to store a second address;
    receiving first and second signals in a control circuit, wherein the control circuit is coupled to the write and undo registers;
    storing the contents of the write register into the undo register when the first and second control signals are in a first state; and
    storing the contents of the undo register into the write register when the first and second control signals are in a second state,
    wherein storing the contents of the write register into the undo register when the first and second control signals are in a first state occurs after incrementing the write register to store a second address.

2. A method of processing data comprising:
    loading first data into a memory during a first write operation, wherein the first data is loaded into the memory beginning at a first address stored in a write register and undo register;
    incrementing the write register to store a second address;
    receiving first and second signals in a control circuit, wherein the control circuit is coupled to the write and undo registers;
    storing the contents of the write register into the undo register when the first and second control signals are in a first state; and
    storing the contents of the undo register into the write register when the first and second control signals are in a second state,
    wherein storing the contents of the undo register into the write register when the first and second control signals are in a second state occurs after incrementing the write register to store a second address.

3. The method of claim 1 wherein storing the contents of the undo register into the write register when the first and second control signals are in a second state occurs after incrementing the write register to store a second address.

4. The method of claim 1 wherein the first data comprises header string data.

5. The method of claim 1 wherein the first data comprises data from at least one of layer 5, layer 6, or layer 7 of a standard open system interconnect networking model.

6. The method of claim 1 wherein the first data comprises data from layer 5 or above of a networking model.

7. The method of claim 2 wherein the first data comprises header string data.

8. The method of claim 2 wherein the first data comprises data from at least one of layer 5, layer 6, or layer 7 of a standard open system interconnect networking model.

9. The method of claim 2 wherein the first data comprises data from layer 5 or above of a networking model.

* * * * *